United States Patent
Cendrillon et al.

(10) Patent No.: US 9,054,765 B2
(45) Date of Patent: Jun. 9, 2015

(54) SYSTEMS AND METHODS FOR SUPPRESSING INTERFERENCE IN A WIRELESS COMMUNICATION SYSTEM

(71) Applicant: Marvell World Trade Ltd., St. Michael (BB)

(72) Inventors: Raphael Cendrillon, Palo Alto, CA (US); Yakun Sun, Sunnyvale, CA (US); Hongyuan Zhang, Fremont, CA (US); Atul Salhotra, Santa Clara, CA (US); Hui-Ling Lou, Sunnyvale, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 13/655,766

(22) Filed: Oct. 19, 2012

(65) Prior Publication Data

US 2013/0101060 A1    Apr. 25, 2013

Related U.S. Application Data

(60) Provisional application No. 61/549,419, filed on Oct. 20, 2011.

(51) Int. Cl.
*H04B 7/08* (2006.01)
*H04B 1/707* (2011.01)

(52) U.S. Cl.
CPC .... *H04B 7/0854* (2013.01); *H04B 2001/70724* (2013.01); *H04B 7/0851* (2013.01)

(58) Field of Classification Search
USPC ........................................................ 375/267
See application file for complete search history.

(56) References Cited

U.S. PATENT DOCUMENTS

| | | | |
|---|---|---|---|
| 6,826,240 B1 | 11/2004 | Thomas et al. | |
| 7,525,942 B2 | 4/2009 | Cordone | |
| 7,532,864 B2 | 5/2009 | Fukuoka et al. | |
| 7,630,688 B2 | 12/2009 | Zeira | |
| 7,639,729 B2 | 12/2009 | Pan et al. | |
| 7,697,602 B2 * | 4/2010 | Frey et al. | 375/231 |
| 7,738,530 B2 | 6/2010 | Thomas | |
| 7,822,101 B2 | 10/2010 | Reial | |
| 7,835,700 B2 | 11/2010 | Zeira | |
| 8,270,909 B2 | 9/2012 | Zhang et al. | |
| 8,275,337 B2 | 9/2012 | Tong et al. | |

(Continued)

FOREIGN PATENT DOCUMENTS

| | | |
|---|---|---|
| EP | 1821445 | 8/2007 |
| WO | 0113530 | 2/2001 |

OTHER PUBLICATIONS

International Search Report and Written Opinion of the International Searching Authority dated Apr. 3, 2013 for related/corresponding appl. No. PCT/US12/060981 filed Oct. 19, 2012.

(Continued)

*Primary Examiner* — Santiago Garcia

(57) ABSTRACT

Systems and methods are provided for suppressing interference from a received data signal. A characteristic of a channel is estimated, the channel being configured for transmission of data between a transmitting device and a receiving device having two or more receive antennas. A spatial correlation of interference is determined for the two or more receive antennas based on the channel characteristic. The received data signal is filtered based on the spatial correlation.

15 Claims, 7 Drawing Sheets

(56) References Cited

U.S. PATENT DOCUMENTS

| | | | |
|---|---|---|---|
| 8,503,291 | B1 | 8/2013 | Lee et al. |
| 8,526,892 | B2 | 9/2013 | Zhang et al. |
| 8,625,701 | B2 | 1/2014 | Zhang et al. |
| 8,630,376 | B1 | 1/2014 | Zhang |
| 8,644,412 | B2 | 2/2014 | Jia et al. |
| 8,699,978 | B1 | 4/2014 | Nabar et al. |
| 8,737,501 | B2 | 5/2014 | Shah et al. |
| 2007/0121749 | A1* | 5/2007 | Frey et al. ............ 375/267 |
| 2009/0310724 | A1 | 12/2009 | Shah |
| 2009/0322613 | A1 | 12/2009 | Bala et al. |
| 2010/0046453 | A1 | 2/2010 | Jones et al. |
| 2010/0087151 | A1* | 4/2010 | Auer ............ 455/67.11 |
| 2010/0260138 | A1 | 10/2010 | Liu et al. |
| 2010/0272207 | A1* | 10/2010 | Zangi et al. ............ 375/267 |
| 2011/0116488 | A1 | 5/2011 | Grandhi |
| 2012/0195391 | A1 | 8/2012 | Zhang et al. |
| 2012/0275332 | A1 | 11/2012 | Seok et al. |
| 2012/0300874 | A1 | 11/2012 | Zhang |
| 2013/0010632 | A1 | 1/2013 | Wang et al. |
| 2013/0102256 | A1* | 4/2013 | Cendrillon et al. ......... 455/63.4 |
| 2013/0182662 | A1 | 7/2013 | Zhang et al. |
| 2013/0322277 | A1 | 12/2013 | Vanganuru et al. |
| 2014/0003384 | A1 | 1/2014 | Zhang et al. |
| 2014/0029681 | A1 | 1/2014 | Zhang et al. |
| 2014/0112175 | A1 | 4/2014 | Pantelidoiu et al. |

OTHER PUBLICATIONS

International Search Report and Written Opinion of the International Searching Authority dated Apr. 3, 2013 for related/corresponding appl. No. PCT/US12/060804 filed Oct. 18, 2012.

Draft Supplement to Standard [for] Information Technology Telecommunications and information exchange between systems Local and metropolitan area networks Specific requirements Part 11: Wireless LAN Medium Access Control (MAC) and Physical Layer (PHY) specifications: Further Higher Data Rate Extension in the 2.4 GHz band (Amendment to IEEE Std 802.11, 1999 Edition), IEEE P802.11g/D8.2, Apr. 2003.

Gunnam, et al, "Multp-Rate layered Decoder Architecture for Block LDPC Codes of the IEEE 802.11n Wireless Standard", ISCAS 2007: 1645-1648.

Draft Supplement to Standard [for] Information Technology Telecommunications and information exchange between systems Local and metropolitan area networks Specific requirements Part 11: Wireless LAN Medium Access Control (MAC) and Physical Layer (PHY) specifications: Further Higher Data Rate Extension in the 2.4 GHz band (Amendment to IEEE Std 802.11, 1999 Edition) IEEE Std 802.11a-1999.

IEEE P802.11ac™/D2.1, "Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz," Prepared by the 802.11 Working Group of the 802 Committee, 363 total pages (incl. pp. i-xxv, 1-338), Mar. 2012.

802.11b-1999/Cor Jan. 2001—IEEE Standard for Information Technology—Telecommunications and Information Exchange Between Systems—Local and Metropolitan Area Networks—Specific Requirement. Part 11: Wireless LAN Medium Access Control (MAC) and Physical Layer (PHY) Specifications. Amendment 2: Higher-Speed Physical Layer (PHY) Extension in the 2.4 GHz Band—Corrigendum 1 (Corrigendum to IEEE Std 802.11b-1999), Nov. 7, 2001.

Gallagher, Robert G., Stochastic Processes: Theory for Application: Chapter 10 Estimation, Cambridge University Press, 2013, ISBN 978-1-107-03975-9, pp. 478-511.

Ganti, Radha Krishna et al., Spatial and Temporal Correlation of the Interference in ALOHA Ad Hoc Networks, Department of Electrical Engineering, University of Notre Dame, Apr. 8, 2009, 7 pages.

Halperin, Daniel et al., 802.11 with Multiple Antennas for Dummies, University of Washington and Intel Labs Seattle, undated, 7 pages.

Salz Jack et al., Effect of Fading Correlation on Adaptive Arrays in Digital Mobile Radio, IEEE Transactions on Vehicular Technology vol. 43, No. 4, Nov. 1994, pp. 1049-1057.

Sadough, Seyed Mohammad-Sajad et al., Recent Developments in Channel Estimation and Detection for MIMO Systems, Chapter 6, undated, pp. 99-122.

Taricco, Giorgia et al., Space-Time Decoding with Imperfect Channel Estimation, IEEE Transactions on Wireless Communication, vol. 4, No. 4, Jul. 2005, pates 1874-1868.

Werner, Stefan et al., Adaptive Multiple-Antenna Receiver for CDMA Mobile Reception, Helsinki University of Technology, Laboratory of Telecommunications Technology, undated, 5 pages.

Office Action issued Nov. 10, 2014 in related/corresponding U.S. Appl. No. 14/327,878, filed Jul. 10, 2014.

Notice of Allowance mailed Oct. 8, 2014 in related/corresponding U.S. Appl. No. 13/654,925, filed Oct. 18, 2012.

* cited by examiner

SYSTEMS AND METHODS FOR SUPPRESSING INTERFERENCE IN A WIRELESS COMMUNICATION SYSTEM

CROSS-REFERENCE TO RELATED APPLICATIONS

This disclosure claims priority to U.S. Provisional Patent Application 61/549,419, filed on Oct. 20, 2011, which is incorporated herein by reference.

This application is related to U.S. patent application Ser. No. 13/654,925, filed on Oct. 18, 2012, entitled "Systems and Methods for Suppressing Interference in a Signal Received by a Device Having Two or More Antennas," published as U.S. Application Publication No. 2013/0102256, which is incorporated herein by reference.

TECHNICAL FIELD

The technology described in this patent document relates generally to wireless communications and more particularly to systems and methods for suppressing interference in a signal received at a device including two or more receive antennas.

BACKGROUND

In the field of wireless communications, SIMO (Single Input Multiple Output) and MIMO (Multiple Input Multiple Output) technologies have been used to achieve increased data throughput and link range without requiring additional bandwidth or increased transmission power. Both technologies utilize multiple receive antennas on a receiver to enable a multipath rich environment with multiple orthogonal channels existing between a transmitter and the receiver. Data signals can be transmitted in parallel over these channels, enabling increased data throughput and link range. Because of its advantageous properties, SIMO and MIMO technologies have been used in wireless communication standards such as IEEE 802.11 (WiFi), 4G, 3GPP Long Term Evolution (LTE), WiMAX, and HSPA+.

Despite the performance improvements enabled by SIMO and MIMO systems, interference in a data signal received by a receiving device may have a significant impact on throughput and reliability of data transmissions in these systems.

SUMMARY

The present disclosure is directed to systems and methods for suppressing interference from a received data signal. A characteristic of a channel is estimated, the channel being configured for transmission of data between a transmitting device and a receiving device having two or more receive antennas. A spatial correlation of interference is determined for the two or more receive antennas based on the channel characteristic. The received data signal is filtered based on the spatial correlation.

As another example, a system for suppressing interference from a received data signal includes a channel estimation block configured to estimate a characteristic of a channel, the channel being configured for transmission of data between a transmitting device and a receiving device having two or more receive antennas. A spatial correlation block is configured to determine a spatial correlation of interference at the two or more receive antennas based on the channel characteristic, and a filtering block is configured to use the spatial correlation of the interference to suppress interference from a signal received at the receiving device.

DETAILED DESCRIPTION

Figure 1:
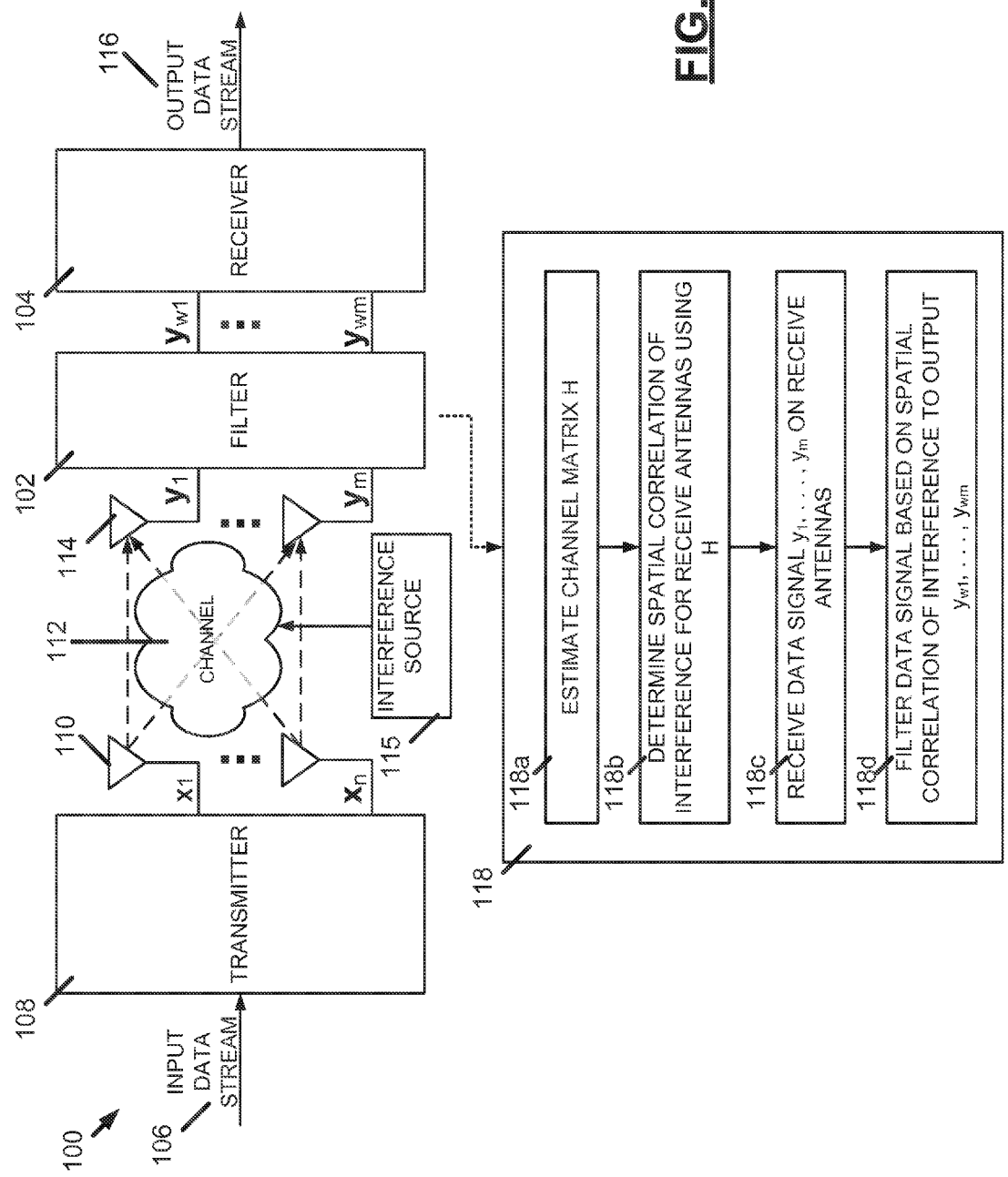
FIG. 1 is a block diagram of an example communications system utilizing an interference rejection filter to decrease interference in a data signal received by a receiver.

FIG. 1 is a block diagram of an example communications system 100 utilizing an interference ejection filter 102 to decrease interference in a data signal received at a receiver 104. In the example communications system 100 of FIG. 1, an input data stream 106 is received by a transmitter 108 and subsequently transmitted over a plurality of transmission antennas 110. The transmission antennas 110 transmit the input data stream 106 using a plurality of signals $x_1, \ldots, x_n$, where n is equal to a number of transmission antennas of the transmitter 108. The plurality of (data) signals $x_1, \ldots, x_n$ are transmitted via a channel 112 to a plurality of receive antennas 114 associated with the receiver 104. The channel 112 affects the plurality of signals $x_1, \ldots, x_n$ transmitted, such that modified versions of these signals, $y_1, \ldots, y_m$, are received on the receive antennas 114, where in is equal to the number of receive antennas of the receiver 104. The received signals $y_1, \ldots, y_m$ on the receive antennas 114 may be modified from the transmitted signals $x_1, \ldots, x_n$ due to properties of the channel 112, interference, and/or noise at the receive antennas 114. For example, interference can be injected into the signal modified by channel 112 by an interferene source 115, such as a wireless device transmitting to a wireless receiver other than receiver 104 (e.g., a WiFi STA communicating with a different base station (AP), a mobile phone communication with a different base station). The system 100 can be described generally via the following equation:

$$y=Hx+z, \quad \text{(Equation 1)}$$

where H is a channel matrix that defines characteristics of the channel 112, x is a data matrix that defines the plurality of signals $x_1, \ldots, x_n$ transmitted by the transmitter 108, y is a data matrix that defines the plurality of signals $y_1, \ldots, y_m$ received on the receive antennas 114, and z is an interference-and-noise matrix that affects the transmission of the signals $x_1, \ldots, x_n$.

In one embodiment, a transmitter is simultaneously transmitting to multiple receivers. A particular receiver will receive the signals targeting at that receiver together with signals that is not intended for it, all from the same transmitter. This will happen, for example, in the downlink multi-user MIMO transmission in 3GPP LTE and IEEE 802.11. In the example communications system 100 of FIG. 1, the transmitted signal 110 from the transmitter 108 can be a weighted sum of the signals intended for receiver 104, together with the signals not intended for receiver 104, which the interference comprises of. In such a case, the data matrix x in Equation 1 contains both desired signals and interference, and the channel matrix H contains both the channels that propagates the desired signals, and the channels that causes interference.

In another embodiment, multiple transmitters are simultaneously transmitting to a single receiver. The multiple transmitters can be virtually viewed as a single transmitter with the number of antennas equal to the sum of the transmitter antennas at each individual transmitter. When the receiver tries to decode for one transmitter, the interference consists of the signals from other transmitters, This may happen, for example, in the uplink transmission in 3GPP LTE, and IEEE 802.11. In the example communications system 100 of FIG. 1, the transmitter 108 is a virtual transmitter. The receiver 104 attempts to decode the signals from each individual transmitter that the transmitter 108 consists of. In such a case, the data matrix x in Equation 1 contains both desired signals and interference, and the channel matrix H contains both the channels that propagates the desired signals and the channels that causes interference, In Equation 1, the channel matrix H defines characteristics of the transmission channel, generally, as well as characteristics of an interference channel that causes interference to be received at the receive antennas 114 in certain cases. As noted above, the received signals $y_1, \ldots, y_m$ are modified from the originally transmitted signals $x_1, \ldots, x_n$ due to interference at the receive antennas 114. To suppress the interference received at the receiver 104, the interference rejection filter 102 is used to filter the received signals $y_1, \ldots, y_m$ and output filtered signals $y_{w1}, \ldots, y_{wm}$ to the receiver 104. The filtered versions of the received signals, $y_{w1}, \ldots, y_{wm}$, have decreased interference versus their received counterparts $y_1, \ldots, y_m$. Using the filtered signals $y_{w1}, \ldots, y_{wm}$, the receiver 104 generates an output data stream 116. The output data stream 116 may include a summation of the filtered signals $y_{w1}, \ldots, y_{wm}$ or may be based on a different combination of the filtered signals.

The filtering performed by the interference rejection filter 102 suppresses interference in the received signals $y_1, \ldots, y_m$ by decorrelating spatial interference between the receive antennas 114 of the receiver 104. Interference may be spatially correlated between the receive antennas 114, such that the interference rejection filter 102 suppresses the interference by decorrelating interference between the antennas 114. The spatial correlation of the interference between the receive antennas 114 indicates how interference received at a particular one of the receive antennas 114 is related to interference received at another one of the receive antennas 114. The filtering performed by the filter 102 may thus be a spatial whitening process configured to decorrelate the interference between the receive antennas 114.

The interference rejection filter 102 suppresses interference in a signal received at the receiver 104 by performing steps 118 configured to determine the spatial correlation of the interference at the receive antennas 114 and to use the spatial correlation of the interference in a filtering operation. At 118a, the filter 102 estimates the channel matrix H. As described above, the channel matrix H defines characteristics of the channel 112 that affect the transmission of the data signals $x_1, \ldots, x_n$ from the transmitter 108. The receiver 104 and filter 102 have no a priori knowledge of the channel matrix H and thus estimate the channel matrix H based on received data samples (e.g., based on a transmission of a plurality of pilot sequences including known reference data). At 118b, a spatial correlation of interference for the receive antennas 114 is determined using the estimated channel matrix H. The spatial correlation of interference indicates how interference received at a particular one of the receive antennas 114 is related to interference received at another one of the receive antennas 114. The correlation of interference may be determined by analyzing characteristics of the channel matrix H that are attributable to the interference channel or may be determined by analyzing an interference and noise matrix associated with the receive antennas 114. In one example, determining the correlation of interference includes determining a spatial covariance for the interference at the receive antennas 114.

At 118c, the filter 102 receives data signals $y_1, \ldots, y_m$ on the receive antennas 114, where the data signals $y_1, \ldots, y_m$ include interference data. At 118d, using the spatial correlation of interfrmce determined in step 118b, the filter 102 filters the data signals $y_1, \ldots, y_m$ to output filtered versions of the signals $y_{w1}, \ldots, y_{wm}$. The filtered versions of the signals $y_{w1}, \ldots, y_{wm}$ have decreased interference, as the filtering procedure is configured to suppress the interference by decorrelating the interference at the receive antennas 114. The filtered signals $y_{w1}, \ldots, y_{wm}$ are output by the interference rejection filter 102 and transmitted to the receiver 104. Thus, the steps 118 are used to determine the correlation of interference at the receive antennas 114 and to filter the received data signals $y_1, \ldots, y_m$ based on this correlation, such that interference may be suppressed at the receiver 104.

Figure 2:
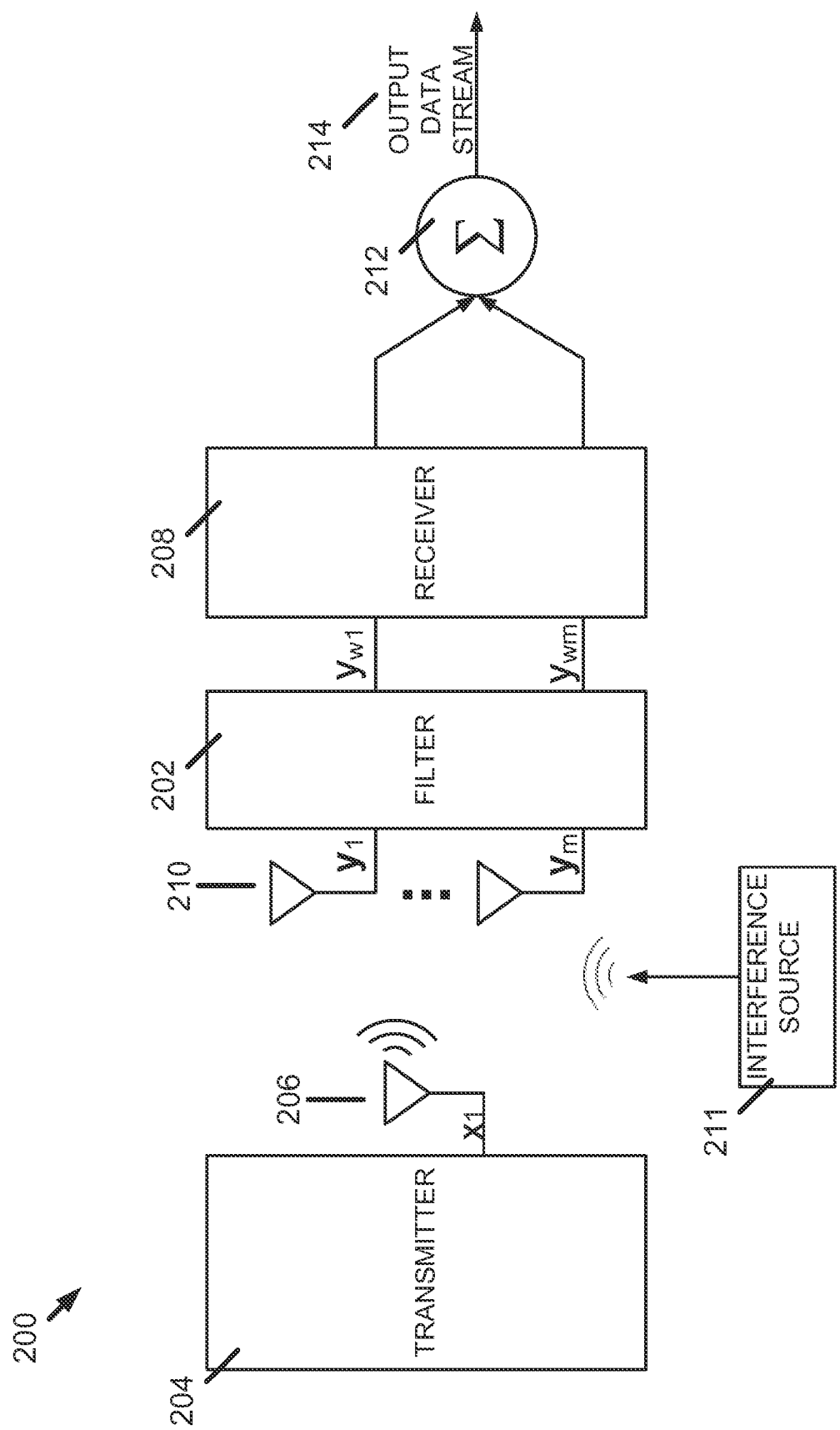
FIG. 2 is a block diagram depicting a SIMO (Single Input Multiple Output) system employing an interference rejection filter to decrease interference in a data signal received by a receiver.

Although FIG. 1 depicts the use of the filter 102 to suppress interference in the context of a MIMO (Multiple Input Multiple Output) system having multiple transmission antennas 110 at the transmitter 108, a similar interference rejection filter may be applied in the context of a SIMO (Single Input Multiple Output) system. FIG. 2 is a block diagram depicting a SIMO system 200 employing an interference rejection fitter 202 to decrease interference in a signal received at a receiver 208. In the SIMO system 200 of FIG. 2, a transmitter 206 uses a single transmitting antenna 206 to transmit an input signal $x_1$ to the receiver 208 having a plurality of receive antennas 210, where a number of receive antennas 210 is equal to m. Interference at the receive antennas 210 (e.g., interference originating from an interference source 211) and characteristics of a transmission channel separating the transmitter 204 and the receiver 208 cause signals received at the receive antennas $y_1, \ldots, y_m$ to be modified versus the transmitted signal $x_1$. The filter 202 suppresses the interference at the receive antennas 210 to output filtered. versions of the received signals $y_{w1}, \ldots, y_{wm}$ to the receiver 208. Filter 202 functions by determining a spatial correlation of interference between the receive antennas 210 and using the spatial correlation to suppress the interference by decorrelating the interference at the receive antennas 210. The filtered versions of the received signals, $y_{w1}, \ldots, y_{wm}$, are received at a summation node 212 and combined in a single output data stream 214.

Figure 3:
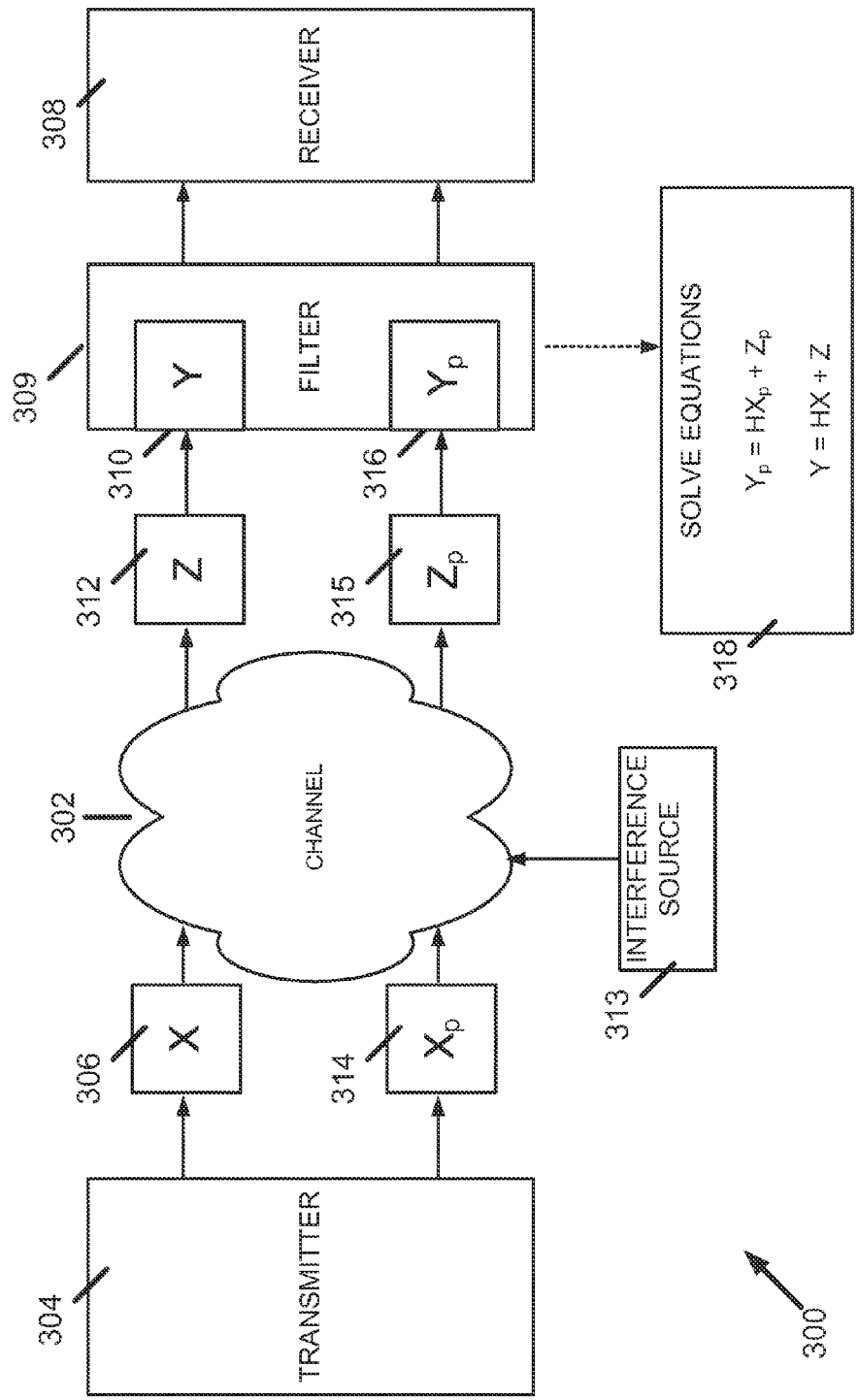
FIG. 3 is a block diagram illustrating a system that uses pilot sequence data to estimate characteristics of a transmission channel.

FIG. 3 is a block diagram illustrating a system 300 that uses pilot sequence data to estimate characteristics of a transmission channel 302. In the system 300 of FIG. 3, a transmitter 304 transmits a data matrix X 306 to a receiver 308. The transmitted data matrix X 306 is received by a filter 309 preceding the receiver 308 as received data matrix Y 310. The received data matrix Y 310 is modified from the transmitted data matrix X 306 due to characteristics of the channel 302 (as defined by channel matrix H) and by a noise matrix Z 312. As explained above with respect to FIGS. 1 and 2, the characteristics of the channel 302 cause interference, such as interference from the depicted interference source 313, to be included in the received data matrix Y 310, such that the filter 309 is used to suppress interference by decorrelating the interference at receive antennas of the receiver 308.

In one example, to decorrelate the interference at the receive antennas of the receiver 308, the filter 309 estimates the channel matrix H to determine characteristics of the channel 302 affecting the transmission of data matrix X 306. Because neither the filter 309 nor the receiver 308 have a priori knowledge of the channel matrix H, the filter 309 estimates the channel matrix H using received data samples. The filter 309 makes this estimation based on a transmission of pilot sequence matrix $X_p$ 314 from the transmitter 304. The pilot sequence matrix $X_p$ 314 includes a set of known reference values (i.e., a set of symbols whose locations and values are known to the filter 309 and receiver 308). The pilot sequence matrix $X_p$ 314 and data matrix X 306 are both affected by the same channel matrix H, such that the receive antennas of the receiver 308 separately observe the following matrices:

$$Y = HX + Z, \quad \text{(Equation 2)}$$

and $$Y_p = HX_p + Z_p, \quad \text{(Equation 3)}$$

where $Z_p$ 315 is a noise matrix affecting the transmission of pilot sequence matrix $X_p$ 314, and $Y_p$ 316 is a data matrix received at the filter 309 that is a modified version of the transmitted data matrix $X_p$, the modification being caused by characteristics of the channel matrix H and by the noise matrix $Z_p$ 315. Z and $Z_p$ may have the same distribution and may be set equal to each other in some examples. By solving Equations 2 and 3 at 318, the filter 309 determines an estimated channel matrix H. The filter 309 uses the estimated channel matrix H to determine a relationship between the receive antennas of the receiver 308, where the relationship indicates how interference received at a particular one of the receive antennas is related to interference received at another one of the receive antennas. The filter 309 uses the relationship between the two or more receive antennas to filter the data signal, where the filtering decreases interference data of the received data matrix Y 310 at the receiver 308.

Figure 4:
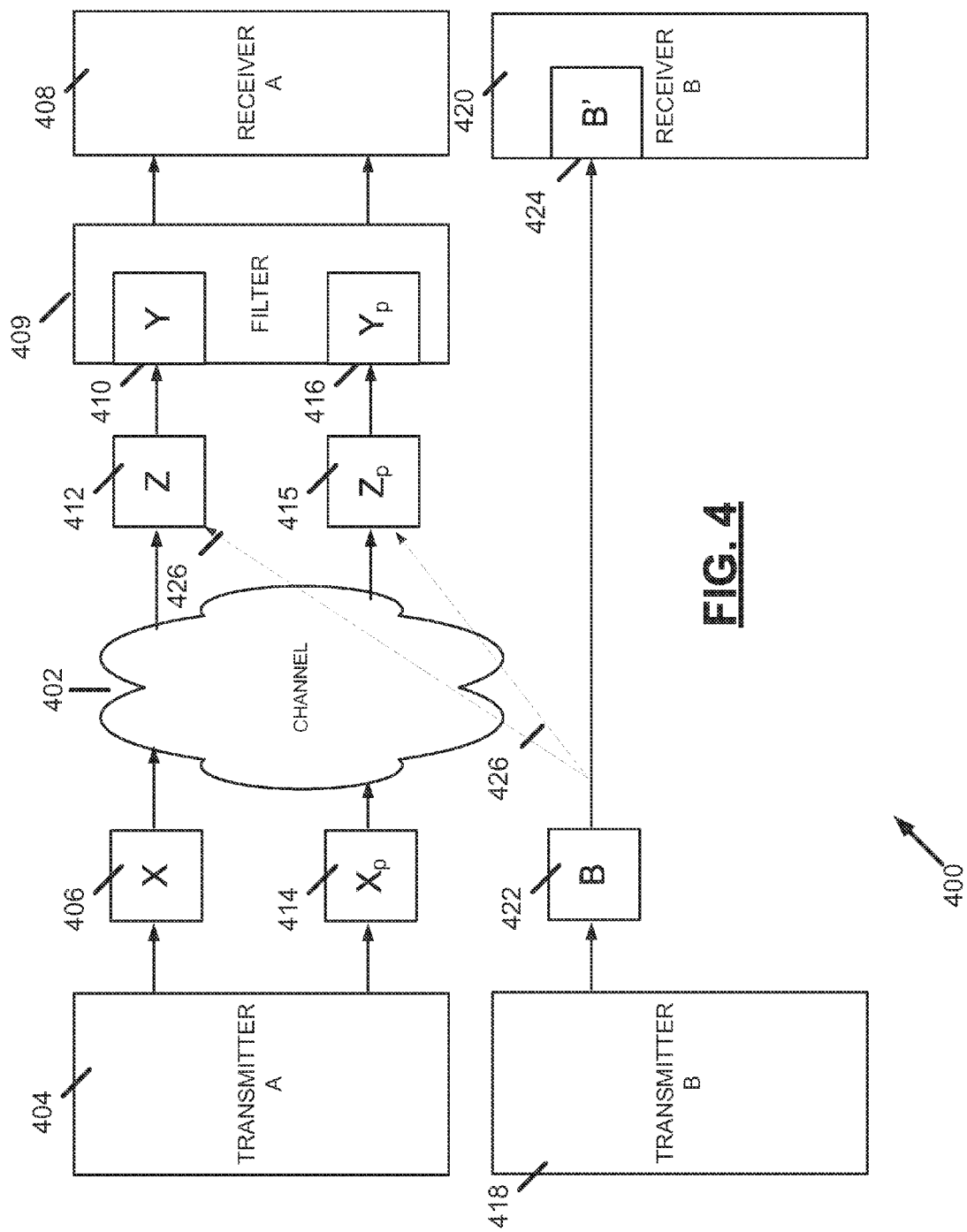
FIG. 4 is a block diagram illustrating a system that includes a second transmitter-receiver pair that provides a source of interference.

FIG. 4 is a block diagram illustrating a system that includes a second transmitter-receiver pair that provides a source of interference. In the system 400 of FIG. 4, Transmitter A 404 transmits a data matrix X 406 to a Receiver A 408. The transmitted data matrix X 406 is received by a filter 409 preceding Receiver 408 as received data matrix Y 410. The received data matrix Y 410 is modified from the transmitted data matrix X 406 due to characteristics of the channel 402 (as defined by channel matrix H) and by a noise matrix Z 412. The characteristics of the channel 402 may cause interference to be included in the received data matrix Y 410, such that the filter 409 is used to suppress interference by decorrelating the interference at receive antennas of the receiver 408.

FIG. 4 depicts an interference source in the form of the Transmitter B 418, Receiver B 420 pair that can be a source of such interference. Transmitter B 418 transmits data matrix B 422 to Receiver B 420, where such data 422 is received at Receiver B 420 as data matrix B' 424. Despite data matrix B 422 being intended for Receiver B 420, due to factors such as the proximity of Transmitter B 418 to Receiver A 408, Receiver A's reception of its intended data matrix 410 may be interfered with by Transmitter B's transmission 422, as indicated at 426. To resolve errors that could be caused by this interference 426, which could affect achievable data rates, the filter 409 seeks to suppress the interference 426 using a decorrelation procedure. While FIG. 4 provides an example having a second transmitter, in general, several transmitters may exist, each providing a source of interference.

Such decorrelation procedures may take a variety of forms. In one example, a decorrelation procedure takes advantage of a pilot portion of a data signal in estimating a channel characteristic. As noted above, in certain systems, such as a WiFi system, certain portions of data signals (e.g., packets) include a portion of data that is known to both the transmitter and receiver, which can be used for a variety of purposes, such as synchronization. As noted by Equation 1, the received signal is equal to the transmitted data, X, times a channel characteristic plus a noise term. Ignoring the noise term and rearranging Equation 1, an instantaneous estimate of the channel characteristic at an antenna, r, on sub-carrier, k, at time, t, can be denoted as:

$$h_{instant}(k,t,r,s) = y(k,t,r)/x(k,t,s) \quad \text{(Equation 4)}$$

where $x(k,t,s)$ is the known pilot data for the k sub-carrier at time t from the transmit antenna s. Equation 4 shows an example of independently solving an instantaneous channel estimate for each transmit antenna. When multiple transmit antennas transmit pilot data simultaneously, another example may jointly solve an instantaneous channel estimate for all antennas. An instantaneous channel estimate may be improved by filtering several instantaneous estimates. Such filtering can be done across different time indexes, different subcarrier indexes, or combinations thereof. For example, the improved channel estimate for tone k at time t could be calculated as the average of the instantaneous channel estimates at tones k−1, k, and k+1 as:

$$h_{avg}(k,t,r,s) = (h_{instant}(k-1,t,r,s) + h_{instant}(k,t,r,s) + h_{instant}(k+1,t,r,s))/3 \quad \text{(Equation 5)}$$

Similarly, the improved channel estimate for the tone k at time t could be calculated as the average of the instantaneous channel estimates at times t−1, t, and t+1 as:

$$h_{avg}(k,t,r,s) = (h_{instant}(k,t-1,r,s) + h_{instant}(k,t,r,s) + h_{instant}(k,t+1,r,s))/3 \quad \text{(Equation 6a)}$$

It may be desirable to limit an amount of time that the range [t−1, t+1] can span to prevent misleading filtering/averages based on evolving channel characteristics. In an asynchronous transmission environment with little traffic, such a limit may be breached. Such a constraint can be implemented by preventing a determination of $h_{avg}$ until three $h_{instant}$ determinations within the time limit are made. In some other scenarios having slow channel evolution (e.g., an in home WiFi connection), a filtered channel estimate from previous packets can be used instead of using a future instantaneous channel estimate:

$$h_{avg}(k,t,r,s) = (h_{instant}(k,t-2,r,s) + h_{instant}(k,t-1,r,s) + h_{instant}(k,t,r,s))/3 \quad \text{(Equation 6b)}$$

The filtered channel estimate can be used to determine an estimate of the interference by subtracting the filtered channel estimate from a particular instantaneous channel estimate. For example, the estimate of the interference, z, for a subcarrier k at time t for an antenna r can be determined according to:

$$z(k,t,r) = y(k,t,r) - \Sigma_{k,s} h_{avg}(kt,p,s) s(kt,s) \quad \text{(Equation 7a)}$$

When only one transmit antenna is transmitting pilot data at a time, $x(k,t,u) = 0$, for u=1 to n and u≠s, the estimate of the interference, z, can also be determined according to $$z(k,t,r) = h_{instant}(k,t,r,s) - h_{avg}(k,t,r,s) \quad \text{(Equation 7b)}$$

The spatial correlation can be determined using those interference estimates determined fir each of the plurality of antennas. For example, between two antennas (antenna p and antenna q), the correlation r of the interference between receive antenna p and receive antenna q can be calculated according to:

$$r(p,q)=\Sigma_{k,t} z(k,t,p)z(k,t,q)^*  \quad \text{(Equation 8)}$$

Such a process can be repeated for all combinations of p and q, where a spatial covariance matrix R is formed by using r(p,q) as the element on row p and column q of R, where future incoming data signals are filtered based on $R^{-1/2}$ In some examples, the summation is limited to sub-carriers within a coherence bandwidth of the interference and symbols within the coherence time of the interference.

A spatial covariance matrix may be determined in other ways as well. For example, a receiver, such as Receiver A 408 may receive a packet, such as that depicted as data matrix B 422, that is not intended for Receiver A 408 (i.e., data matrix B 422 is actually intended for Receiver B 420). Despite this, as part of its physical (PHY) level processing, Receiver A 408 (or its filter 409) perform channel estimation to identify a characteristic, $h_0$, of the channel through which data matrix B 422 traveled. After PHY level processing, Receiver A 408 performs media access control (MAC) processing that determines that data matrix B 422 is not intended for Receiver A 408.

Despite data matrix B 422 not being intended for Receiver A 408, Receiver A 408 can take advantage of the channel estimation $h_0$ performed when receiving data matrix B 422 to reduce interference. Because Receiver A 408 was able to receive data matrix B 422, Receiver A 408 can consider Transmitter B 418 to be a likely source of interference. Using the determined channel estimation $h_0$ for the transmission from the interfering Trans i B 418, the spatial covariance matrix that be used for filtering future received data signals can be determined according to:

$$R=h_0 h_0^*  \quad \text{(Equation 9)}$$

FIG. 4 is an example where one interference source 418 sends a data packet 422. In some embodiments, more than one interference source can simultaneously send data packets. The receiver 408 can determine the channel estimate for each interference source, identify them as interference sources, and then determine the spatial covariance matrix as the sum of each spatial covariance matrix in Equation 9 from each interference source.

In addition, the receiver 408 can store a collection of the channel estimates $h_0$ and/or the spatial covariance matrix R from each interfering transmitter that have been detected. This collection can be maintained whenever an interfering transmitter in the collection has been detected again. The channel estimate and/or the spatial covariance matrix for this particular interfering transmitter can be then filtered with or replaced by the recent estimates.

Figure 5:
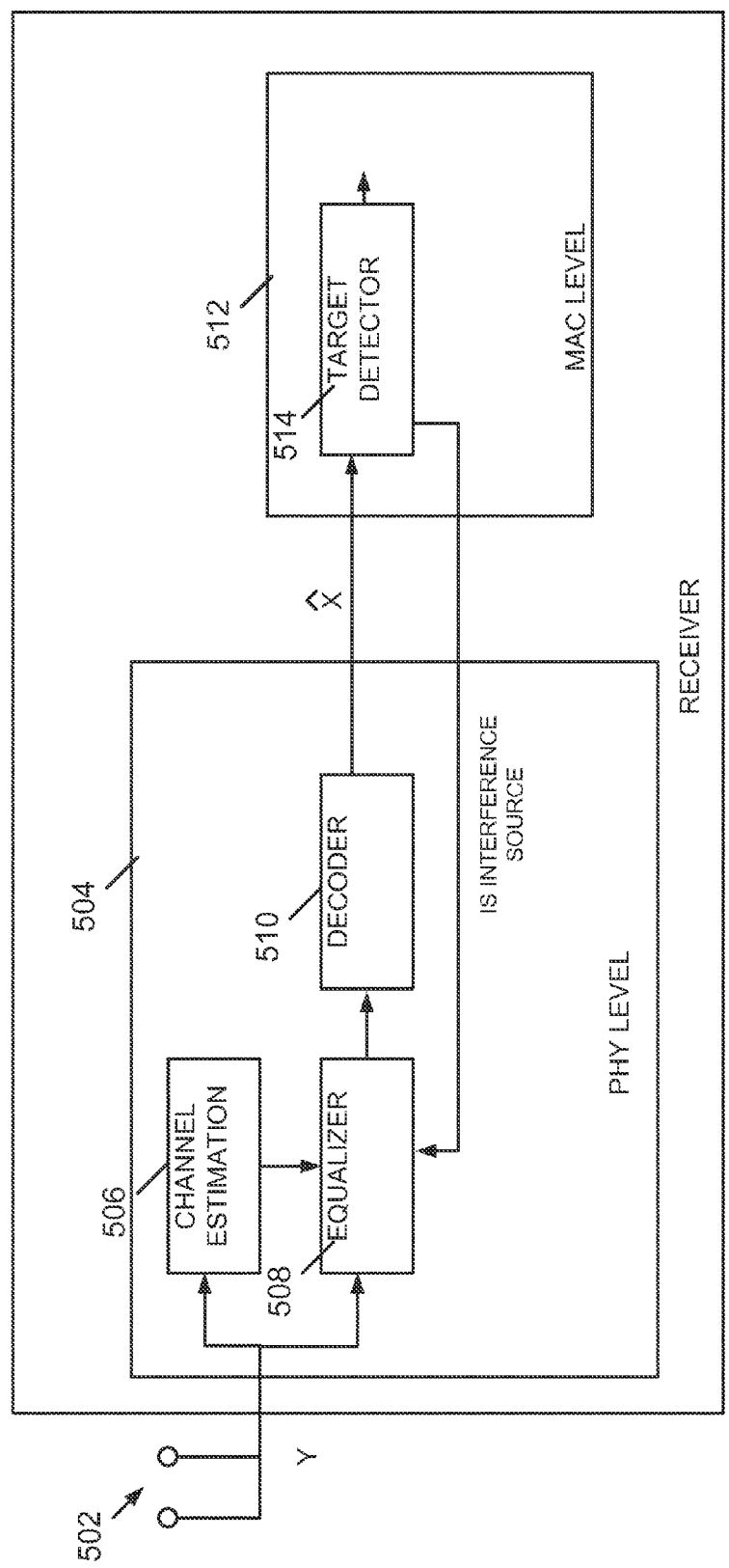
FIG. 5 is a block diagram depicting example processing by physical layer and media access control layer modules of a received data signal to suppress interference.

FIG. 5 is a block diagram depicting an example receiver 500 that includes physical layer and media access control layer modules processing a received data signal to suppress interference. A data signal is received via a plurality of antennas 502. Physical (PHY) level processing 504 performs channel estimation 506 and equalization 508 associated with a received data packet. Results from channel estimation 506 may be provided to the equalizer 508 for adjustment of the received data signal. An equalizer 508 output s provided to a decoder 510 that generates an estimate of the transmitted data 2 that provided for media access control level processing 512.

In the MAC level processing 512, a target detector 514 determines whether the data packet was intended for the receiver 500. If the data packet was intended for the receiver 500, then the data $\hat{x}$ is outputted for downstream processing. If the data packet was not intended for the receiver 500, then whatever transmitter transmitted that data packet can be identified as an interference source. The target detector 514 sends a message to the equalizer 508 noting that the source of the data packet is an interference source. Knowing that the source of the data packet is an interference source and having already determined a channel characteristic associated with the data packet at 506, the equalizer 508 can use that channel characteristic (e.g., $h_0$) to filter future received data signals to reduce an amount of interference caused by the source of the data packet, such as through use of Equation 9.

As another ample, an interference estimate and corresponding spatial covariance matrix determination can be performed using a data part, y, of a packet and a channel characteristic estimate, $h_e$. The correlation, r, of the noise between receive antenna p and receive antenna q can be estimated according to:

$$r(p,q)=\Sigma_{k,t} y(k,t,p)y(k,t,q)^* - h_e(k,t,p)h_e(k,t,q)^* P_{tx}  \quad \text{(Equation 10)}$$

where y is associated with a received signal for a particular sub-carrier k, at a particular time t, for a particular receiving antenna p or q, where $h_e$ is the channel characteristic estimate for the e particular sub-carrier k, at the particular time t, for the particular receiving antenna p or q, and where $P_{tx}$ is a transmit power. Values for Equation 10 may be calculated for each possible combination of p and q to generate a spatial covariance matrix R, where future incoming data signals are filtered based on $R^{-1/2}$. Equation 10 ma be utilized in a variety of situations including in updating a spatial covariance matrix that has previously been determined using pilot data, where the duration of a data packet transmission may involve changing channel characteristics (e.g., a long data packet transmitted over a time period that is sufficient for channel characteristics to change).

Figure 6:
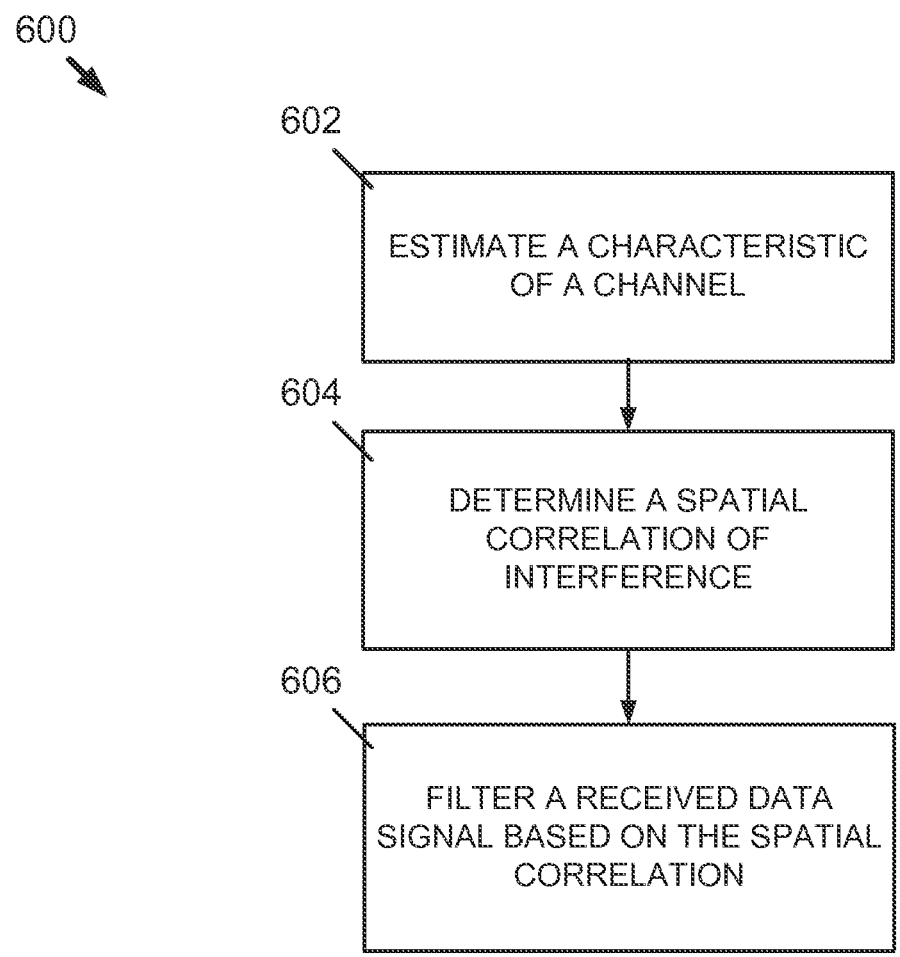
FIG. 6 is a flow diagram depicting a method for reducing interference from a received data signal.

FIG. 6 is a flow diagram depicting a method for reducing interference from a received data signal. At 602, a characteristic of a channel is estimated, where the channel is configured for transmission of data between a transmitting device and a receiving device having two or more receive antennas. At 604, a spatial correlation of interference at the two or more receive antennas is determined based on the channel characteristic. At 606, the received data signal is filtered based on the spatial correlation.

Figure 7:
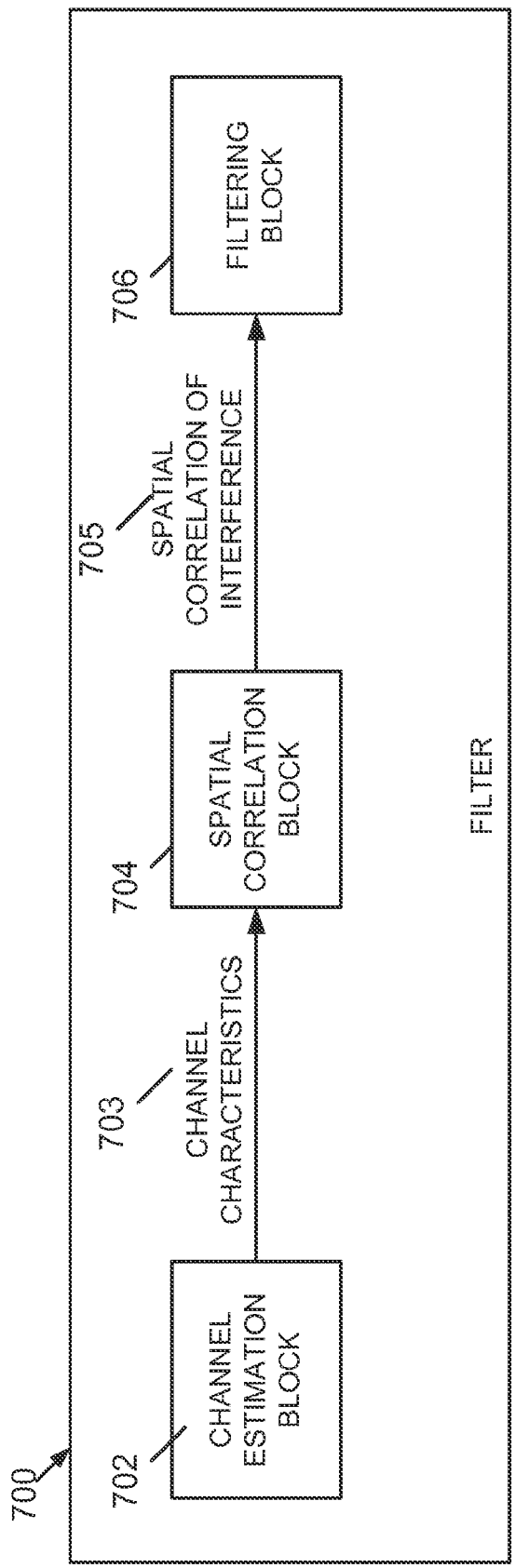
FIG. 7 depicts a filter for reducing interference from a received data signal.

FIG. 7 depicts a filter 700 for reducing interference from a received data signal. The filter 700 includes a channel estimation block 702, a spatial correlation block 704, and a filtering block 706. The channel estimation block 702 is configured to estimate characteristics of a channel 703, where the channel is configured for transmission of data between a transmitting device and a receiving device having two or more receive antennas. The spatial correlation block 704 is configured to determine a spatial correlation of interference 705 at the two or more receive antennas based on the estimated characteristics of the channel 703. The spatial correlation 705 indicates how interference received at a particular one of the receive antennas is related to interference received at another one of the receive antennas. The filtering data block 706 is configured to use the spatial correlation of the interference 705 to suppress interference from a signal received at the receiving device.

While the disclosure has been described in detail and with reference to specific embodiments thereof, it will be apparent It is claimed:

1. A method for suppressing interference from a data signal received at a receiving device, the receiving device having two or more receive antennas, the method comprising:
   estimating a characteristic of a channel through which the data signal was transmitted by a transmitting device to the receiving device, wherein the characteristic of the channel is estimated using a pilot portion of the data signal that contains data that is known to both the transmitting device and the receiving device, and wherein estimating the characteristic of the channel includes,
   (a) determining instantaneous channel estimate using i) the known pilot portion data, and ii) a portion of the received data signal that contains the pilot portion data, and
   (b) determining a filtered channel estimate based on multiple instantaneous channel estimates across a plurality of sub-carriers or across a plurality of times;
   determining, based on the estimated characteristic of the channel, a spatial correlation of interference at the two or more receive antennas of the receiving device; and
   filtering, based on the spatial correlation, the data signal received at the receiving device to suppress the interference in the data signal.

2. The method of claim 1, wherein the instantaneous channel estimate is determined according to:

$$h(k,t,r,s)=y(k,t,r,s)/x(k,t,s),$$

wherein h is the instantaneous channel estimate for a particular sub-carrier (k), at a particular time (t), for a particular receiving device antenna (r) and a particular transmit antenna (s);
   wherein y is associated with a received signal for the particular sub-carrier, at the particular time, for the particular receiving device antenna; and
   wherein x is associated with the pilot portion data for the particular sub-carrier at the particular time from the particular transmit antenna.

3. The method of claim 1 wherein estimating, the characteristic of the channel further includes determining an interference estimate based on a particular instantaneous channel estimate and the filtered channel estimate.

4. The method of claim 3, wherein the spatial correlation is determined based on interference estimates determined for each of the plurality of receiving antennas.

5. The method of claim 3, wherein the interference estimate (z) is determined for two or more receive antennas, wherein the spatial correlation is determined based on a determination of:

$$r(p,q)=\Sigma_{k,t}z(k,t,p)z(k,t,q)^*,$$

wherein r is the interference correlation between a first antenna (p) and a second antenna (q); and
   wherein z is an interference estimate for a particular sub-carrier (k), at a particular time (t), for a particular antenna (p or q).

6. The method of claim 1, wherein the received data signal is filtered based on the inverse, square-root of a spatial covariance matrix that is based on the spatial correlation.

7. The method of claim 1, wherein the characteristic of the channel is estimated for a first transmitting device and first receiving device, wherein the characteristic of the channel is estimated using data from a first packet transmitted by the first transmitting device, and wherein the method further comprises:
   determining whether the first packet is destined for the first receiving device; and
   when the first packet is not destined for the receiving device:
      identifying the first transmitting, device as an interference source;
      wherein the spatial correlation (r) from the first interference source is determined according to:

$$r=h_0 h_0^*,$$

wherein $h_0$ is the channel characteristic for the first transmitting device and the first receiving device.

8. The method of claim 7, wherein the characteristic of the channel is estimated for a second transmitting device and first receiving device, wherein the characteristic of the channel is estimated using data from a second packet transmitted by the second transmitting device, and wherein the method further comprises:
   determining whether the second packet is destined for the first receiving device;
   when the second packet is not destined for the first receiving device:
      identifying the second transmitting device as an interference source;
      wherein the spatial correlation (r) from the second interference source is determined according to:

$$r=r_0+h_1 h_1^*,$$

wherein $h_1$ is the channel characteristic for the first transmitting device and the receiving device, and wherein $r_0$ is the spatial correlation for previously identified interference sources.

9. The method of claim 1, further comprising determining an updated spatial correlation of interference based on i) the channel characteristic and ii) a received data signal, wherein channel characteristics are determined for each of two or more receive antennas, wherein the updated spatial correlation (r) between two receive antennas (p,q) is determined according to:

$$r(p,q)=\Sigma_{k,t}y(k,t,p)y(k,t,q)^*-h(k,t,p)h(k,t,q)^*P_{tx}$$

wherein y is associated with a received signal for a particular sub-carrier (k), at a particular time (t), for a particular receiving device antenna (p or q);
   wherein h is the channel characteristic for the particular sub-carrier, at the particular time (t), for the particular receiving device antenna (p or q); and
   wherein $P_{tx}$, is a transmit power.

10. A system for suppressing interference from a data signal received at a receiving device, the receiving device having two or more receive antennas, the method comprising:
   a channel estimation block configured to estimate a characteristic of a channel through which the data signal was transmitted by a transmitting device to the receiving device, wherein the characteristic of the channel is estimated using a pilot portion of the data signal that contains data that is known to both the transmitting device and the receiving device, and wherein estimating the characteristic of the channel includes,
   (a) determining an instantaneous channel estimate using i) the known pilot portion data. and ii) a portion of the received data signal that contains the pilot portion data, and (b) determining a filtered channel estimate based on multiple instantaneous channel estimates across a plurality of sub-carriers or across a plurality of times;
a spatial correlation block configured to determine, based on the estimated channel characteristic of the channel, a spatial correlation of interference at the two or more receive antennas of the receiving device; and
a filtering block configured to use the spatial correlation of the interference to suppress interference from a signal received at the receiving device.

11. The system of claim 10, wherein the spatial correlation block is configured to determine the spatial correlation of the interference by determining a spatial covariance matrix for the interference at the two or more receive antennas.

12. The system of claim 10, wherein the channel estimation block is configured to estimate the characteristic of the channel by:
determining the filtered channel estimate based on multiple instantaneous channel estimates across a plurality of sub-carriers or across a plurality of times; and
determining an interference estimate based on a particular instantaneous channel estimate and the filtered channel estimate.

13. The system of claim 10, wherein the channel estimation block is configured to estimate the characteristic of the channel for a first transmitting device and first receiving device based on data from a first packet transmitted by the first transmitting device, wherein the system further includes:
a media access control block configured to determine whether the first packet is destined for the first receiving device; and
when the first packet is not destined for the receiving device, the media access control block being configured to:
identify the first transmitting device as an interference source; and
instruct the spatial correlation block to store the channel estimation;
wherein the spatial correlation block is further configured to determine the spatial correlation (r) according to:

$r = h_0 h_0^*$, wherein $h_0$ is the channel characteristic for the first transmitting device and the first receiving device.

14. The system of claim 10, wherein the channel estimation block is further configured to determine an updated spatial correlation of interference based on the characteristic of the channel and a received data signal.

15. The system of claim 10, wherein the channel estimation block, the spatial correlation block, and the filtering block are components of a WiFi receiver.

* * * * *